No. 877,028. PATENTED JAN. 21, 1908.
H. E. WHITE.
MOTOR CONTROL.
APPLICATION FILED JULY 25, 1906.

2 SHEETS—SHEET 1.

Witnesses:

Inventor:
Harold E. White
By Albert G. Davis
Atty.

UNITED STATES PATENT OFFICE.

HAROLD E. WHITE, OF SCHENECTADY, NEW YORK, ASSIGNOR TO GENERAL ELECTRIC COMPANY, A CORPORATION OF NEW YORK.

MOTOR CONTROL.

No. 877,028.

Specification of Letters Patent.

Patented Jan. 21, 1908.

Application filed July 25, 1906. Serial No. 327,683.

*To all whom it may concern:*

Be it known that I, HAROLD E. WHITE, a citizen of the United States, residing at Schenectady, county of Schenectady, State of New York, have invented certain new and useful Improvements in Motor Control, of which the following is a specification.

My invention relates to the control of electric motors driving varying loads. It has been proposed heretofore, in order to equalize the input to electric motors driving varying loads, such as rolling mills, mine-hoists, etc., to provide the motor with a heavy fly-wheel, and with automatic means for lowering the speed of the motor during periods of heavy load in order to enable the fly-wheel to give up a portion of the energy which it has stored during light loads.

The object of my invention is to provide a simple and novel arrangement of switches whereby manual control of the motor may be obtained at starting, and efficient automatic control secured when the motor is up to speed.

Figure 1:
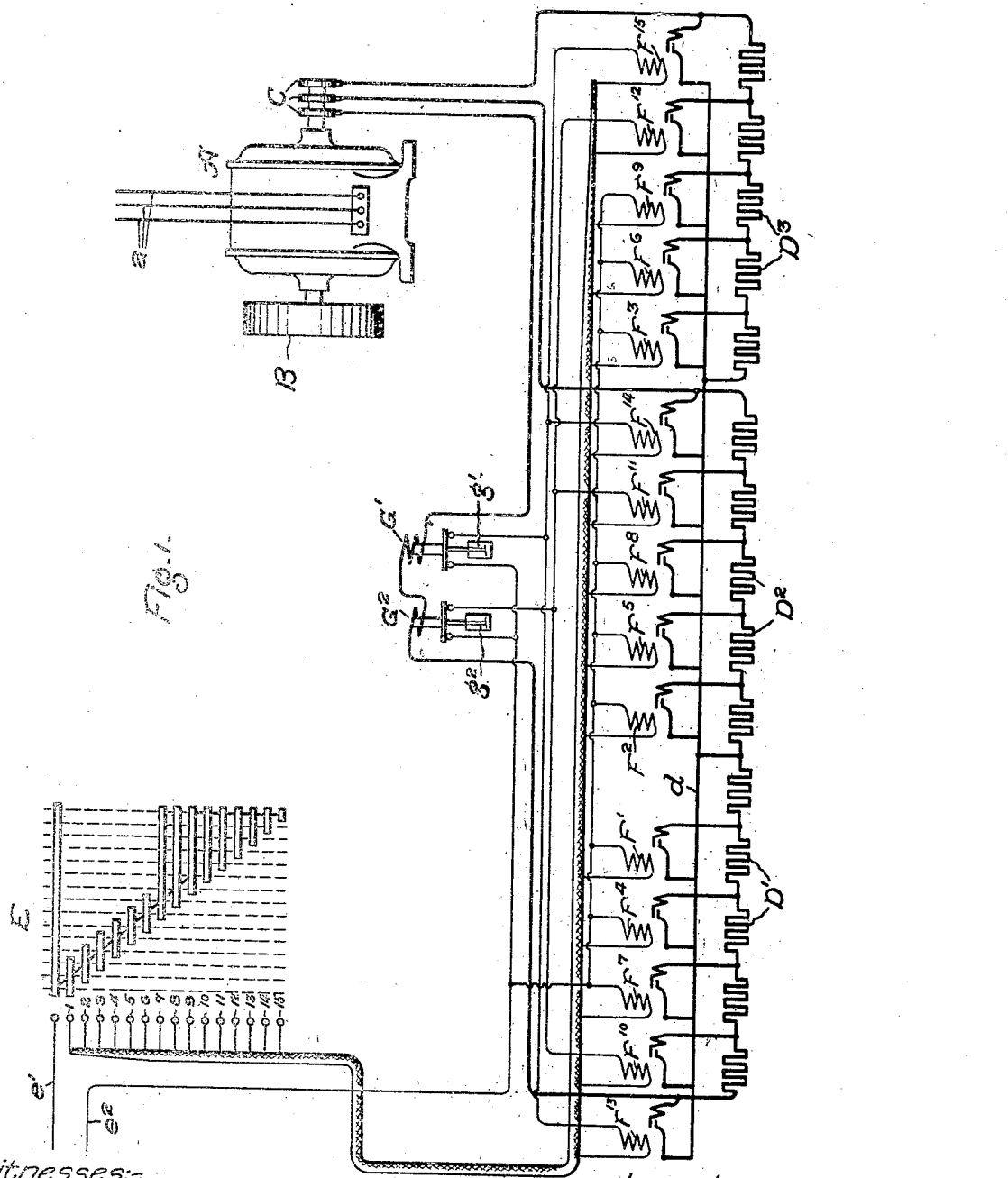
Figure 2:
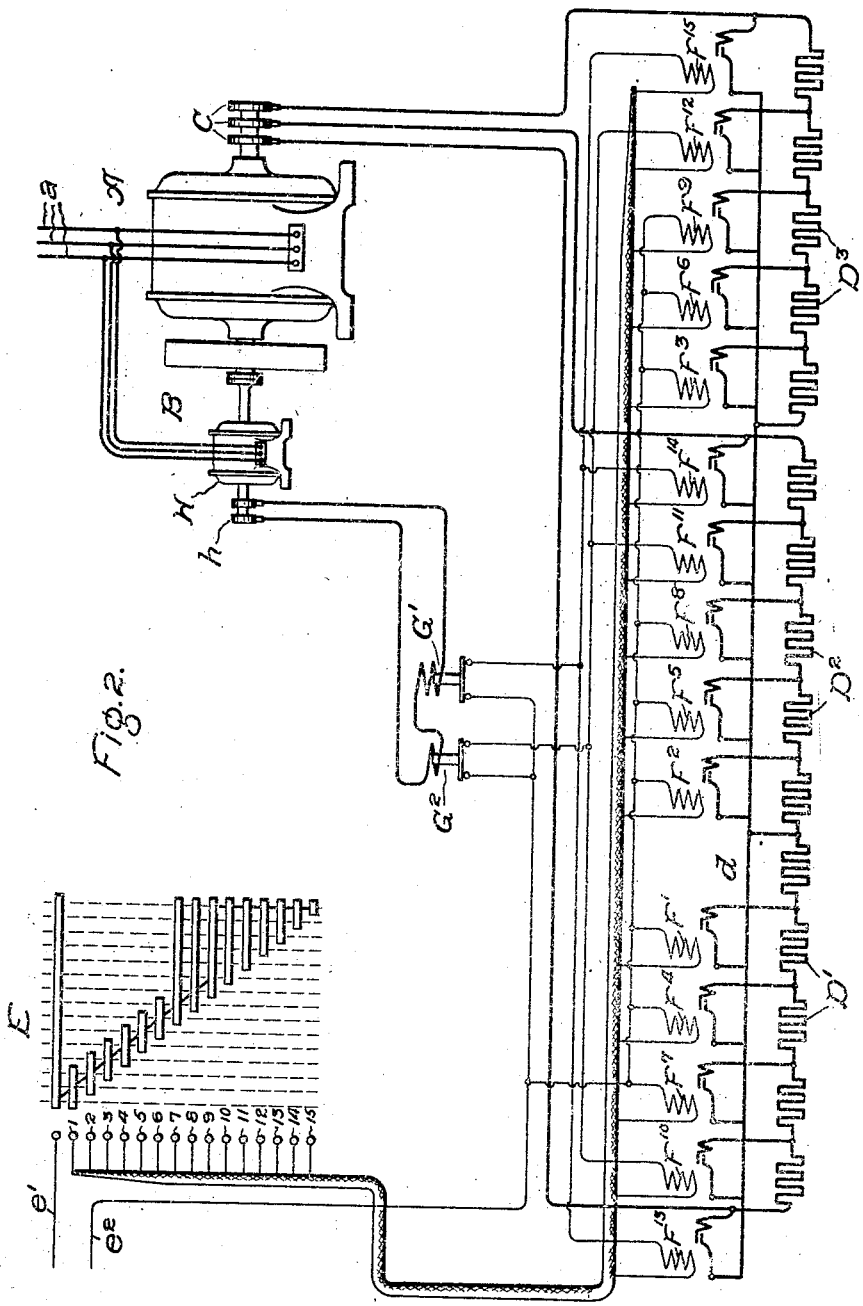

My invention will best be understood by reference to the accompanying drawings, in which Figure 1 shows an electric motor provided with controlling switches arranged in accordance with my invention; and Fig. 2 shows a modification of the same.

In the drawings I have shown my invention applied to the control of an induction motor. My invention, while particularly advantageous for use in connection with induction motors, in which the secondary currents are large in amount and of low voltage, is nevertheless not limited to this particular type of motor.

In Fig. 1, A represents an induction motor, the primary of which is connected through leads $a$ to a source of polyphase current, not shown.

B represents a fly-wheel on the motor shaft.

C represents collecting-rings connected to the secondary winding of the motor. Each collector ring is connected to one terminal of one of the resistances $D^1$, $D^2$ and $D^3$. The other terminals of the resistances are connected to a common conductor $d$.

E represents a manually-operated starting switch for the motor adapted to energize serially the magnets $F^1$ to $F^{15}$, which control contacts for short-circuiting portions of the resistances. With switch E in off-position, as shown, all of the magnets $F^1$ to $F^{15}$ are deenergized, and all of resistances $D^1$, $D^2$ and $D^3$ are in circuit. This is the starting position of the switch. When moved to its first position, switch E connects the lead $e^1$, from any suitable source of current, to contact-finger 1, which is connected to one terminal of magnet winding $F^1$, the other terminal of which is connected to the lead $e^2$, which extends to the other terminal of the source. Magnet $F^1$ is thus energized, short-circuiting a portion of resistance $D^1$. In its second position switch E energizes magnet $F^2$, thereby short-circuiting a portion of resistance $D^2$. As switch E is moved through its other positions, it serially energizes magnets $F^3$, $F^4$, etc. until all of the resistances are short-circuited. While switch E is being thus moved, motor A is accelerating and storing power in the fly-wheel B.

For the automatic control of the speed of the motor, I provide a plurality of electro-magnets $G^1$ and $G^2$, which, in Fig. 1, are shown connected in the secondary circuit of the motor. Magnet $G^1$ is arranged with a greater number of turns, or in any other suitable way, so as to respond to a smaller amount of current than is necessary for actuating magnet $G^2$. It will be seen that magnets $F^{13}$, $F^{14}$, and $F^{15}$, instead of being connected directly to the lead $e^2$, are connected through the contact controlled by magnet $G^1$. Consequently, when the load on the motor rises to a sufficient amount to cause magnet $G^1$ to pull up its core, magnets $F^{13}$, $F^{14}$ and $F^{15}$ are deënergized, thereby cutting in a portion of each of the three resistances. The slip of the motor is thus increased, slowing it down and allowing the fly-wheel B to give up a portion of its energy to take care of the excess of load. If the load further increases, magnet $G^2$ will be energized sufficiently to draw up its core, thereby deënergizing magnets $F^{10}$, $F^{11}$, and $F^{12}$, and cutting more resistance into the secondary circuit of the motor. The number of these magnets $G^1$ and $G^2$ may be increased, if desired, so as to obtain a still further reduction of motor speed. It will be seen that when either magnet $G^1$ or $G^2$ operates, its immediate effect is to cut resistance into the secondary circuit, and thereby to decrease the amount of current flowing in that circuit. The magnet works consequently tend to drop its core again. In order to prevent this, I provide the cores of the magnets G¹ and G² with dash-pots $g^1$ and $g^2$, which retard the closing of the contacts controlled by these magnets, so as to give the motor time to slow down until the secondary current has again reached a sufficient amount to hold the magnet contacts open.

In Fig. 2, I have shown an arrangement in which dash-pots or similar devices are not required, since, in the arrangement of this figure, the operation of magnets G¹ and G² does not directly affect the amount of current passing through them. The arrangement shown in Fig. 2 differs from Fig. 1 only in the connections employed for energizing the magnets G¹ and G². In this figure these magnets, instead of being connected in the secondary circuit of the main motor A, are connected through collector rings $h$ to the secondary circuit of a small auxiliary motor H, which is mounted on the shaft of the main motor, or otherwise geared thereto, and has its primary winding connected in parallel with the primary winding of the main motor. The current induced in the secondary winding of the auxiliary motor, and supplied to the magnets G¹ and G², depends upon the slip of the motor and consequently upon the load on the main motor A. The operation of this arrangement will be readily understood from an inspection of these drawings, and from the description that has been given above of the arrangement of Fig. 1.

While I have shown the fly-wheel B as independent of the motor structure, it is obvious that it may be combined with the rotor of the motor, or with any part of the driven load, if desired. Consequently, when I employ the term "fly-wheel" in the appended claims, I desire to be understood to include any mass having a high moment of inertia, whether included in the motor structure or not. Furthermore, I do not desire to limit myself to the particular construction and arrangement of parts here shown; but aim in the appended claims to cover all modifications which are within the scope of my invention.

What I claim as new and desire to secure by Letters Patent of the United States, is:

1. In combination with an electric motor, a fly-wheel driven thereby, a starting resistance therefor, a manually-controlled switch for cutting said resistance out of circuit, and a plurality of magnetically-actuated switches arranged to cut portions of said resistance into circuit, the actuating magnet windings being connected and arranged to actuate said switches successively when the load on the motor exceeds predetermined amounts.

2. In combination with an electric motor, a fly-wheel driven thereby, a starting resistance therefor, a manually-controlled switch for cutting said resistance out of circuit, and means controlled by the load on said motor for cutting portions of said resistance successively into circuit when the load on the motor exceeds predetermined amounts.

3. In combination with an electric motor, a fly-wheel driven thereby, a starting resistance therefor, a plurality of magnetically-actuated contacts for short-circuiting portions of said resistance, a manually-operated starting switch controlling the actuating magnets for said contacts, and means controlled by the load on the motor controlling a portion of said magnet windings.

4. In combination with an electric motor, a fly-wheel driven thereby, a starting resistance therefor, a plurality of magnetically-actuated contacts for short-circuiting portions of said resistance, a manually-operated starting switch controlling the actuating magnets for said contacts, magnetically-actuated means controlling said magnet windings, and connections for supplying to the actuating winding of said controlling means a current varying with the load on the motor.

5. In combination with an electric motor, a fly-wheel driven thereby, a starting resistance, a plurality of magnetically-actuated contacts for short-circuiting portions of said resistance, a manually-operated starting switch for serially energizing the actuating windings of said contacts, and means for automatically deënergizing a portion of said windings when the load on the motor exceeds a predetermined amount.

6. In combination with an electric motor, a fly-wheel driven thereby, a starting resistance, a plurality of magnetically-actuated contacts for short-circuiting portions of said resistance, a manually-operated starting switch for serially energizing the actuating windings of said contacts, and means for automatically serially deënergizing a portion of said windings when the load on the motor exceeds predetermined amounts.

7. In combination, an induction motor, a fly-wheel driven thereby, a resistance in the secondary circuit of said motor, a plurality of magnetically-actuated contacts for short-circuiting portions of said resistance, a manually-operated starting switch controlling the actuating magnets for said contacts, and means controlled by the load on the motor controlling a portion of said magnet windings.

8. In combination, an induction motor, a fly-wheel driven thereby, a resistance in the secondary circuit of said motor, a plurality of magnetically-actuated contacts for short-circuiting portions of said resistance, a manually-operated starting switch for serially energizing the actuating windings of said contacts, and means for automatically deënergizing a portion of said windings when the load on the motor exceeds a predetermined amount.

9. In combination, an induction motor, a fly-wheel driven thereby, a resistance in the secondary circuit of said motor, a manually-controlled starting switch for cutting said resistance out of circuit, a magnetically-actuated switch for cutting a portion of said resistance into circuit, and connections for supplying to the actuating winding of said switch a current varying with the load on the motor.

10. In combination with an electric motor, a fly-wheel driven thereby, a resistance in circuit therewith, magnetically - actuated contacts for short-circuiting portions of said resistance, and two switches jointly controlling the actuating magnets for said contacts, said switches being controlled one by hand and the other automatically by the load on the motor.

11. In combination with an electric motor, a fly-wheel driven thereby, a resistance in circuit therewith, magnetically - actuated contacts for short-circuiting portions of said resistance, and two switches jointly controlling the actuating magnets for said contacts, said switches controlled one by hand and the other magnetically, and connections for supplying to the controlling magnet of the latter switch a current varying with the load on the motor.

In witness whereof, I have hereunto set my hand this 24th day of July, 1906.

HAROLD E. WHITE.

Witnesses:
BENJAMIN B. HULL,
LULU F. HAMILTON.